US012619099B2

(12) United States Patent
Tsai

(10) Patent No.: US 12,619,099 B2
(45) Date of Patent: May 5, 2026

(54) QUICK RELEASE MECHANISM FOR EYEGLASSES

(71) Applicant: York Tsai, New Taipei City (TW)

(72) Inventor: York Tsai, New Taipei City (TW)

( * ) Notice: Subject to any disclaimer, the term of this patent is extended or adjusted under 35 U.S.C. 154(b) by 328 days.

(21) Appl. No.: 18/442,376

(22) Filed: Feb. 15, 2024

(65) Prior Publication Data

US 2024/0302675 A1     Sep. 12, 2024

(30) Foreign Application Priority Data

Mar. 9, 2023    (TW) ................................. 112202063

(51) Int. Cl.
*G02C 5/14*              (2006.01)

(52) U.S. Cl.
CPC .........  *G02C 5/146* (2013.01); *G02C 2200/08*
(2013.01)

(58) Field of Classification Search
CPC ...... G02C 5/146; G02C 2200/08; G02C 1/10;
G02C 2200/06
See application file for complete search history.

(56) References Cited

U.S. PATENT DOCUMENTS 10,401,646 B2 *  9/2019  Huang ................. G02C 5/2209
12,436,407 B2 *  10/2025  Chen ........................ G02C 1/02

FOREIGN PATENT DOCUMENTS

TW          202132864 A      9/2021

* cited by examiner

*Primary Examiner* — Tuyen Tra
(74) *Attorney, Agent, or Firm* — MUNCY, GEISSLER, OLDS & LOWE, P.C.

(57)              ABSTRACT

A quick release mechanism for eyeglasses includes a connecting member for detachably disposing on one side of an eyeglass component of the eyeglasses, and a fastener member for positioning the connecting member on the eyeglass component and including an operating portion and a latching portion having two short sides. The eyeglass component is formed with an engaging groove having an engaging section and an opening section. The operating portion is operable to move between a locking position, in which neither of the short sides of the latching portion is facing the opening section; and an unlocking position, in which one short side of the latching portion is facing the opening section, and the latching portion is allowed to move out of the engaging section through the opening section and thereby allow the connecting member to detach from the eyeglass component.

7 Claims, 10 Drawing Sheets

QUICK RELEASE MECHANISM FOR EYEGLASSES

CROSS-REFERENCE TO RELATED APPLICATION

This application claims priority to Taiwanese Utility Model Patent Application No. 112202063, filed on Mar. 9, 2023.

FIELD

The disclosure relates to a quick release mechanism, and more particularly to a quick release mechanism that allows quick replacement of eyeglass components.

BACKGROUND

Referring to FIG. 1, eyeglasses 1 with a replaceable lens, as disclosed in Taiwanese Patent Publication No. 202132864, includes a glass frame 11, a lens body 12 disposed under the glass frame 11, and a lens frame 13 detachably mounted to a lower end of the lens body 12. The lens body 12 has a plurality of spaced-apart protrusions 121 protruding from an outer periphery thereof. The lens frame 13 has an embedded groove 131 opening upwardly and corresponding to the lower end of the lens body 12, and a plurality of engaging grooves 132 located in the embedded groove 131 and respectively corresponding to the protrusions 121. During assembly of the eyeglasses 1, the lens body 12 is first disposed under the glass frame 11, after which the lens body 12 is aligned with and then inserted into the embedded groove 131 of the lens frame 13. Next, the protrusions 121 are engaged respectively with the engaging grooves 132, thereby assembling the lens frame 13 to the lens body 12.

Although the eyeglasses 1 can be replaced with different lens bodies 12 or lens frames 13 to achieve different functions of sun protection, safety, special appearance, etc., in order to stably connect the lens frame 13 to the lens body 12, the number of the protrusions 121 must often be more than four. As such, to assemble or disassemble the lens body 12, it is necessary to apply multiple forces to complete the engagement or disengagement of the protrusions 121 with the respective engaging grooves 132, thereby resulting in complicated assembly and disassembly steps.

Moreover, to remove the lens body 12 of the eyeglasses 1, it is necessary to apply a large external force so as to slightly deform the lens frame 13, and only then can the protrusions 121 be disengaged from the respective engaging grooves 132. However, the aforesaid operation may easily cause damage to the lens frame 13 or the lens body 12 during application of the external force. Furthermore, after the lens frame 13 is removed from the lens body 12, it is also necessary to remove the lens body 12 from the glass frame 11, and only then can the lens body 12 be replaced. Hence, removal and replacement of the lens body 12 of the eyeglasses 1 are also complicated.

SUMMARY

Therefore, an object of the present disclosure is to provide a quick release mechanism for eyeglasses that can allow quick replacement of eyeglass components.

According to this disclosure, the quick release mechanism for eyeglasses includes a connecting member and a fastener member. The eyeglasses includes an eyeglass component formed with at least one engaging groove. The at least one engaging groove has an engaging section, and an opening section communicating with the engaging section and having a width measured in a top-bottom direction smaller than a diameter of the engaging section. The connecting member is configured to be removably disposed on one side of the eyeglass component, and is formed with an accommodating groove for receiving the one side of the eyeglass component.

The fastener member is provided for positioning the connecting member on the one side of the eyeglass component, and includes an operating portion located outside the connecting member, and a latching portion extending inwardly from an inner side surface of the operating portion into the connecting member and the engaging section. The latching portion has a maximum length greater than the width of the opening section but less than the diameter of the engaging section. The latching portion has two long sides, and two short sides each connected between one ends of the long sides. The maximum length of the latching portion is measured between the two short sides. Each short side has a width measured in the top-bottom direction less than the width of the opening section and the diameter of the engaging section.

The operating portion is operable to drive the latching portion to rotate, and is movable between a locking position, in which the connecting member is positioned on the eyeglass component, and an unlocking position, in which the connecting member is allowed to detach from the eyeglass component. When the operating portion is in the locking position, neither of the short sides of the latching portion is facing the opening section, and the latching portion is positioned in the engaging section; and when the operating portion is in the unlocking position, one of the short sides of the latching portion is facing the opening section, and the latching portion is allowed to move out of the engaging section through the opening section.

BRIEF DESCRIPTION OF THE DRAWINGS

Other features and advantages of the disclosure will become apparent in the following detailed description of the embodiment with reference to the accompanying drawings. It is noted that various features may not be drawn to scale.

DETAILED DESCRIPTION

Figure 1:
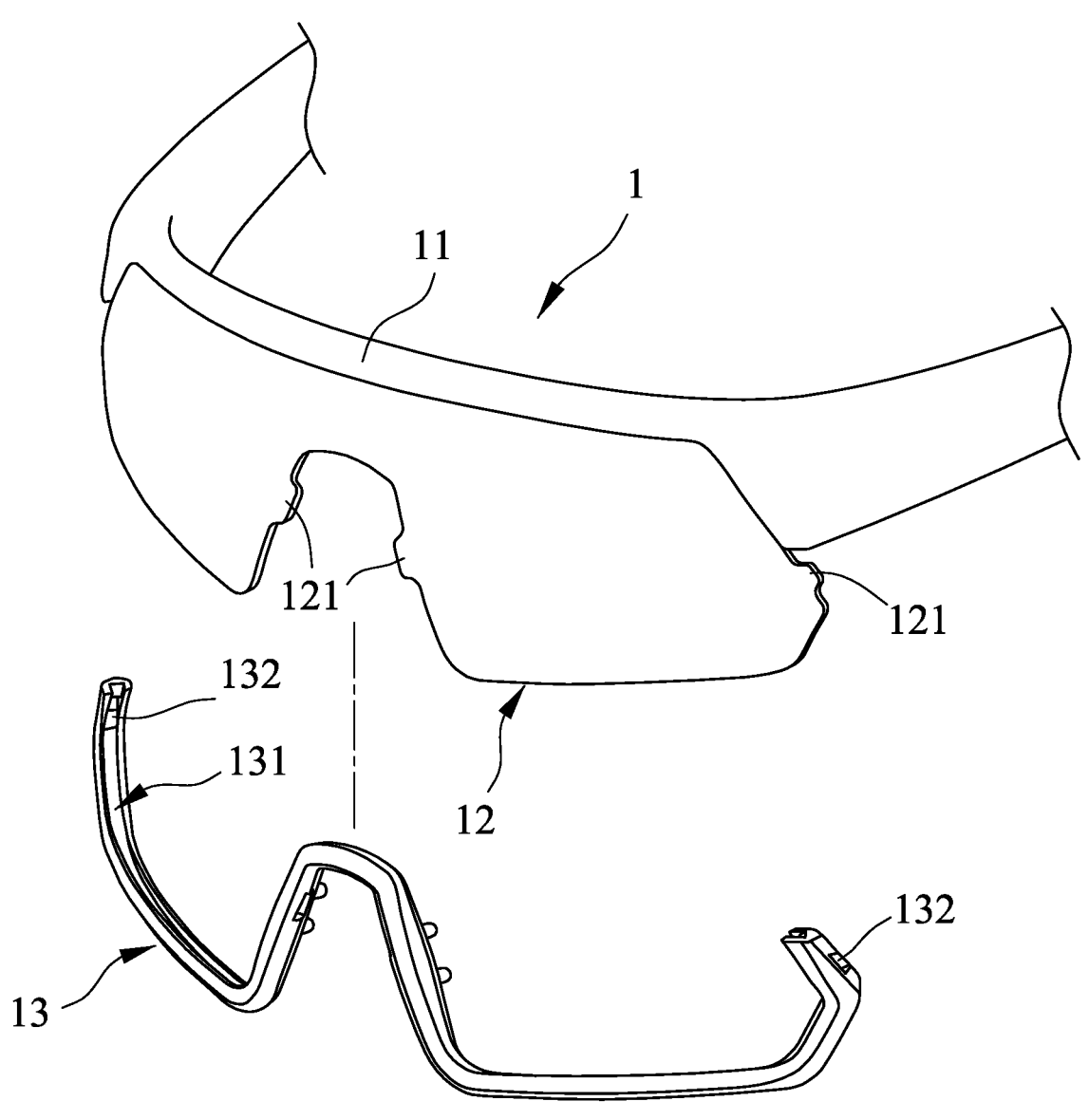
FIG. 1 is an exploded perspective view of eyeglasses disclosed in Taiwanese Patent Publication No. 202132864.
Figure 2:
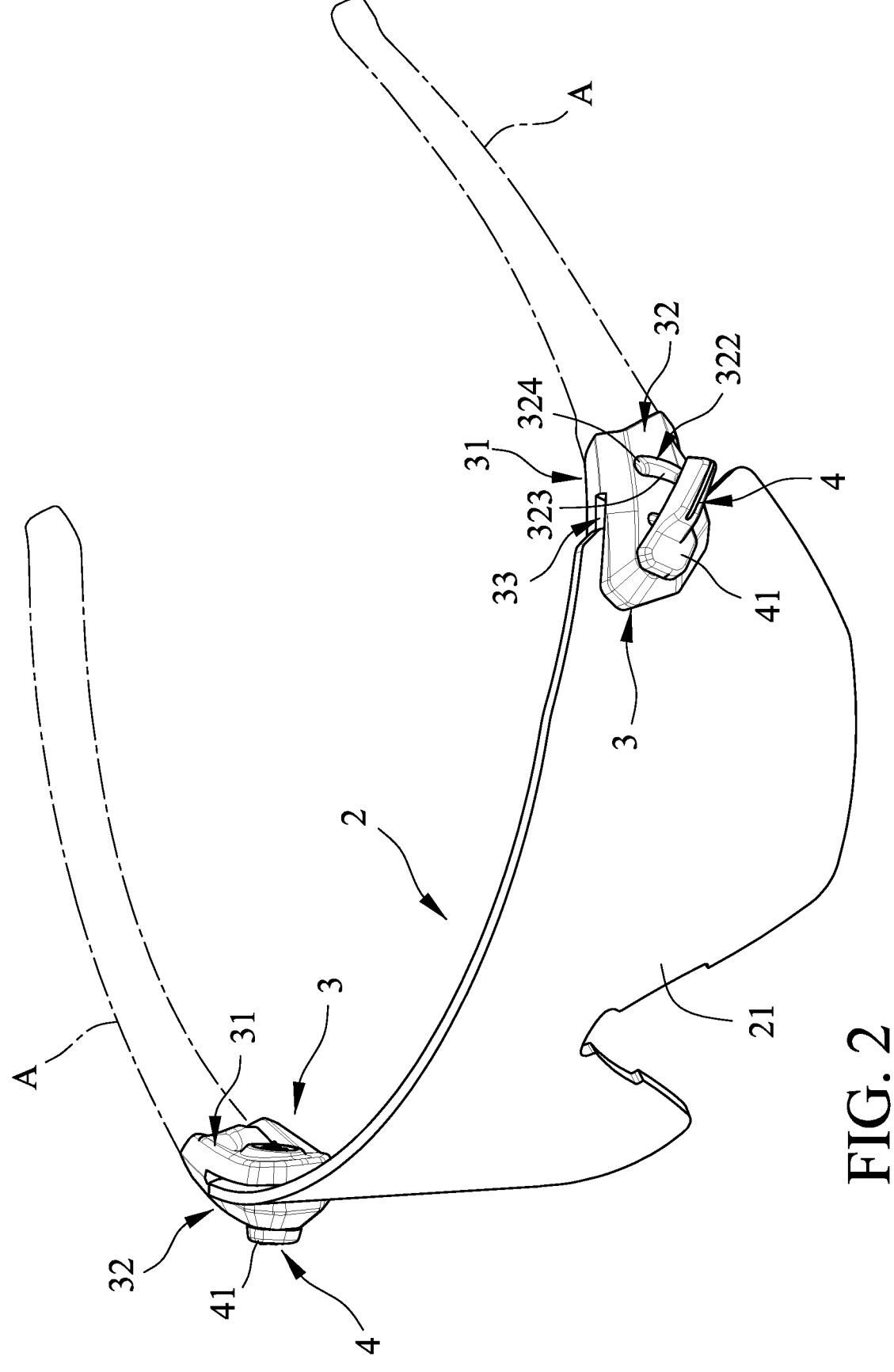
FIG. 2 is a perspective view of a type of eyeglasses incorporating two quick release mechanisms according to an embodiment of the present disclosure.
Figure 3:
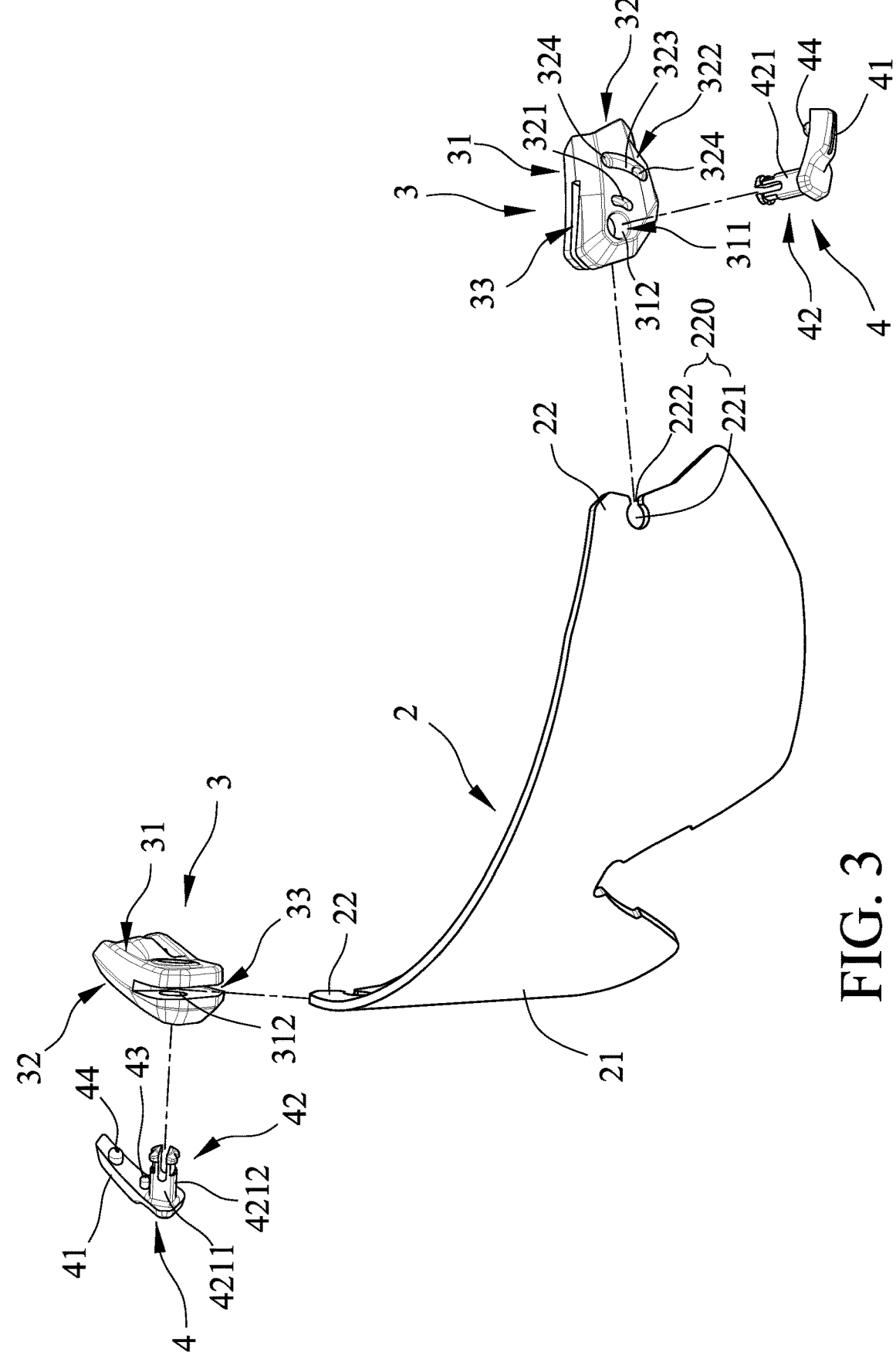
FIG. 3 is an exploded perspective view of FIG. 2.

Referring to FIGS. 2 and 3, two quick release mechanisms according to an embodiment of the present disclosure are shown detachably connected to an eyeglass component 2 of a type of eyeglasses. The eyeglasses include a lens body 21 and two temples (A) (shown in imaginary lines). The eyeglass component 2 exemplified in this case is the lens body 21. Each quick release mechanism of this embodiment includes a connecting member 3 detachably disposed on one of left and right sides 22 of the lens body 21 for connection with a respective one of the temples (A), and a fastener member 4 pivotally disposed on the connecting member 3 for positioning the same on the left or right side 22 of the lens body 21. Since the two quick release mechanisms of this embodiment are identical, only one quick release mechanism connected to the left side 22 of the lens body 21 will be described in detail hereinafter. The left side 22 of the lens body 21 is formed with an engaging groove 220 which has an engaging section 221 in the form of a circular hole, and an opening section 222 extending rearwardly from and communicating with the engaging section 221. The opening section 222 has a width measured in a top-bottom direction smaller than a diameter of the engaging section 221.

Figure 4:
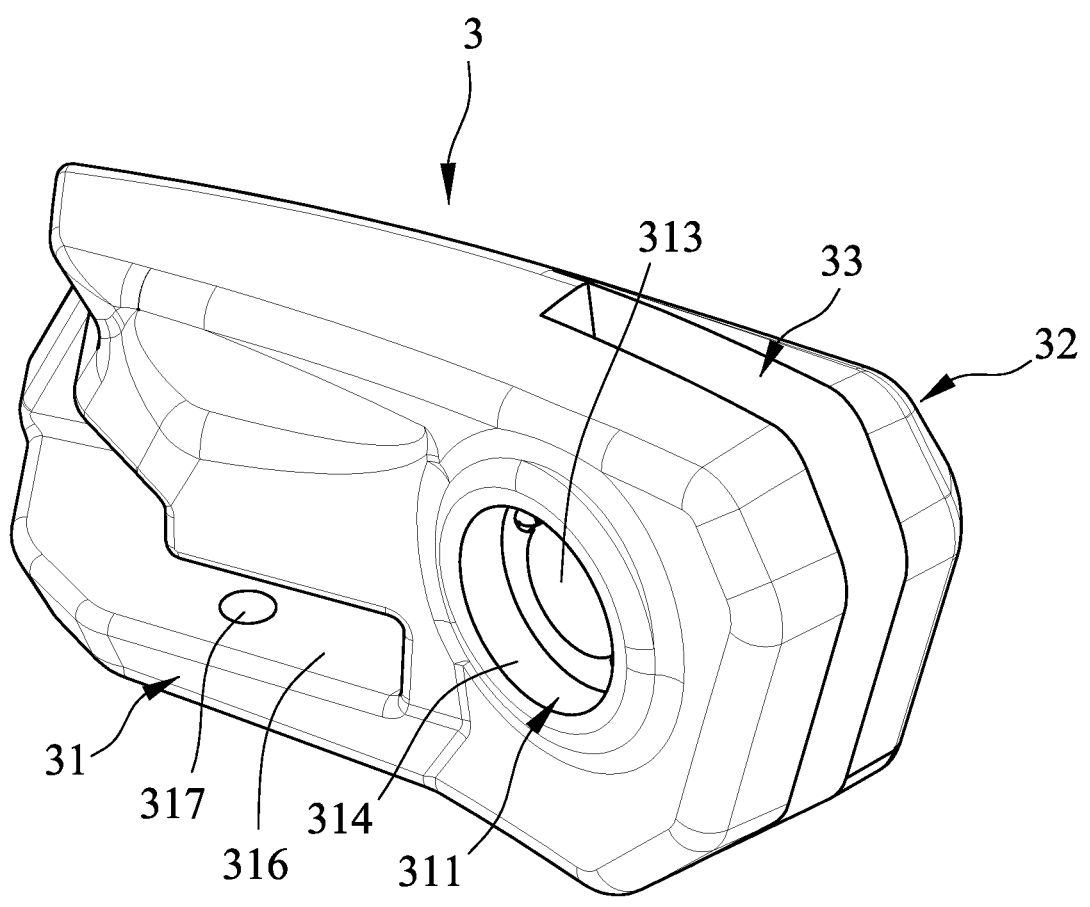
FIG. 4 is an enlarged perspective view of an inner side surface of a connecting member of the quick release mechanism of the embodiment.

Referring to FIG. 4, in combination with FIGS. 2 and 3, the connecting member 3 includes an inner bearing body 31 located mostly on an inner side of the lens body 21, and an outer bearing body 32 located mostly on an outer side of the lens body 21 and connected to and cooperating with the inner bearing body 31 to define an accommodating groove 33 for receiving the left side of the lens body 21 therein. The connecting member 3 is formed with a through hole 311 extending from an outer side surface of the outer bearing body 32 to an inner side surface of the inner bearing body 31, and communicating with the accommodating groove 33.

When the connecting member 3 is assembled to the lens body 21, the engaging section 221 and the opening section 222 are both located in the accommodating groove 33, and the engaging section 221 and the through hole 311 are coaxially aligned and communicate with each other. The through hole 311 has an outer hole section 312 extending inwardly from the outer side surface of the outer bearing body 32 and communicating with the accommodating groove 33, an inner hole section 313 extending inwardly from an outer side surface of the inner bearing body 31 and communicating with the accommodating groove 33, and an enlarged hole section 314 connected to and extending from the inner hole section 313 to the inner side surface of the inner bearing body 31. The inner hole section 313 has a diameter equal to a diameter of the outer hole section 312, but smaller than a diameter of the enlarged hole section 314.

The inner bearing body 31 has a receiving groove 316 located rearwardly of the enlarged hole section 314 for receiving one end of the respective temple (A), and a pair of pivot holes 317 (only one is visible in FIG. 4) for receiving a pair of studs (not shown) provided on the one end of the respective temple (A). The outer bearing body 32 has a curved guide groove 321 formed in the outer side surface thereof adjacent to the outer hole section 312, and a curved slide groove 322 formed in the outer side surface thereof and spaced apart from and located rearwardly of the guide groove 321. That is, the guide groove 321 is located between the outer hole section 312 and the slide groove 322. The slide groove 322 has an intermediate groove section 323, and two positioning groove sections 324 respectively located on two opposite ends of the intermediate groove section 323.

Figure 5:
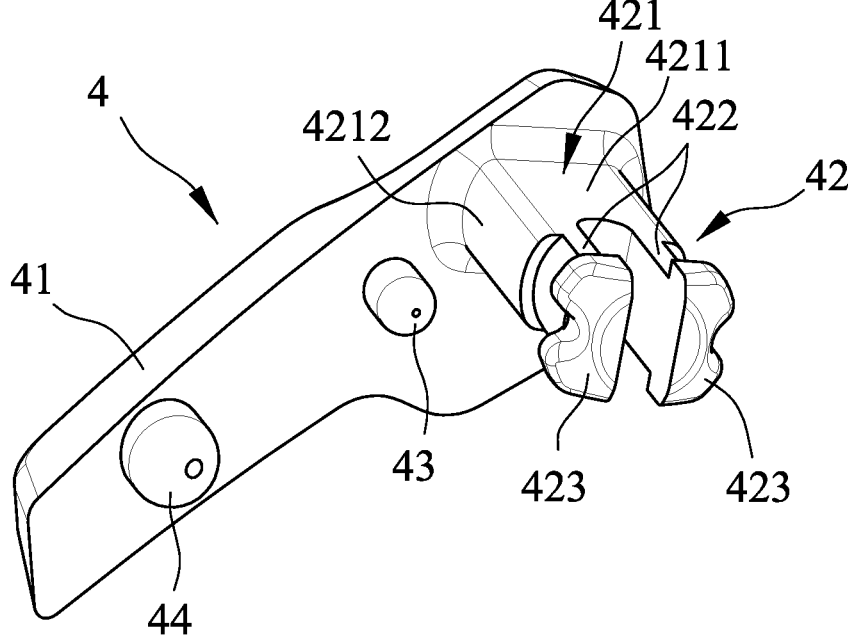
FIG. 5 is an enlarged perspective view of an inner side surface of a fastener member of the quick release mechanism of the embodiment.

Referring to FIG. 5, in combination with FIGS. 2 to 4, the fastener member 4 includes an operating portion 41 located outside the connecting member 3, a latching portion 42 extending inwardly from an inner side surface of the operating portion 41 into the connecting member 3 and the engaging section 221, a guide pin 43 extending inwardly from the inner side surface of the operating portion 41 adjacent to the latching portion 42 and slidably received in the guide groove 321, and a positioning pin 44 extending inwardly from the inner side surface of the operating portion 41 distal to the latching portion 41 and slidably received in the slide groove 322. The latching portion 42 has a latch body 421 for extension into the outer hole section 312 and the engaging section 221, two spaced-apart extensions 422 extending inwardly from the latch body 421 into the inner hole section 313 and the enlarged hole section 314, and two engaging hooks 423 that are respectively connected to inner ends of the extensions 422, that extend out of the enlarged hole section 314 and engage with the inner side surface of the inner bearing body 31, and that face away from each other. The latch body 421 has two long sides 4211, and two short sides 4212 each connected between one ends of the long sides 4211. The latch body 421 has a maximum length that extends between the short sides 4212 thereof and that is greater than the width of the opening section 222, but less than the diameter of the engaging section 221. Each short side 4212 has a width measured in the top-bottom direction less than the width of the opening section 222 and the diameter of the engaging section 221.

When the operating portion 41 is not operated, the engaging hooks 423 are engaged with the inner side surface of the inner bearing body 31, so as to limit the fastener member 4 on the connecting member 3. In addition, since the extensions 422 are spaced apart from each other, in conjunction with the flexible nature of their material, the extensions 422 can be deformed to move toward each other when the operating portion 41 is operated. Hence, when the operating portion 41 is operated, the extensions 422 are deformed to move toward each other and allow the engaging hooks 423 to pass through the enlarged hole section 314 and out of the inner hole section 313. Specifically, the operation of the operating portion 41 is by pulling. Therefore, the engaging hooks 423 can be inserted into or removed from the through hole 311 through the deformation of the extensions 422 so as to assemble or disassemble the fastener member 4 to or from the connecting member 3. Repair, replacement, and modularization of various components of the eyeglasses can thus be facilitated.

Figure 6:
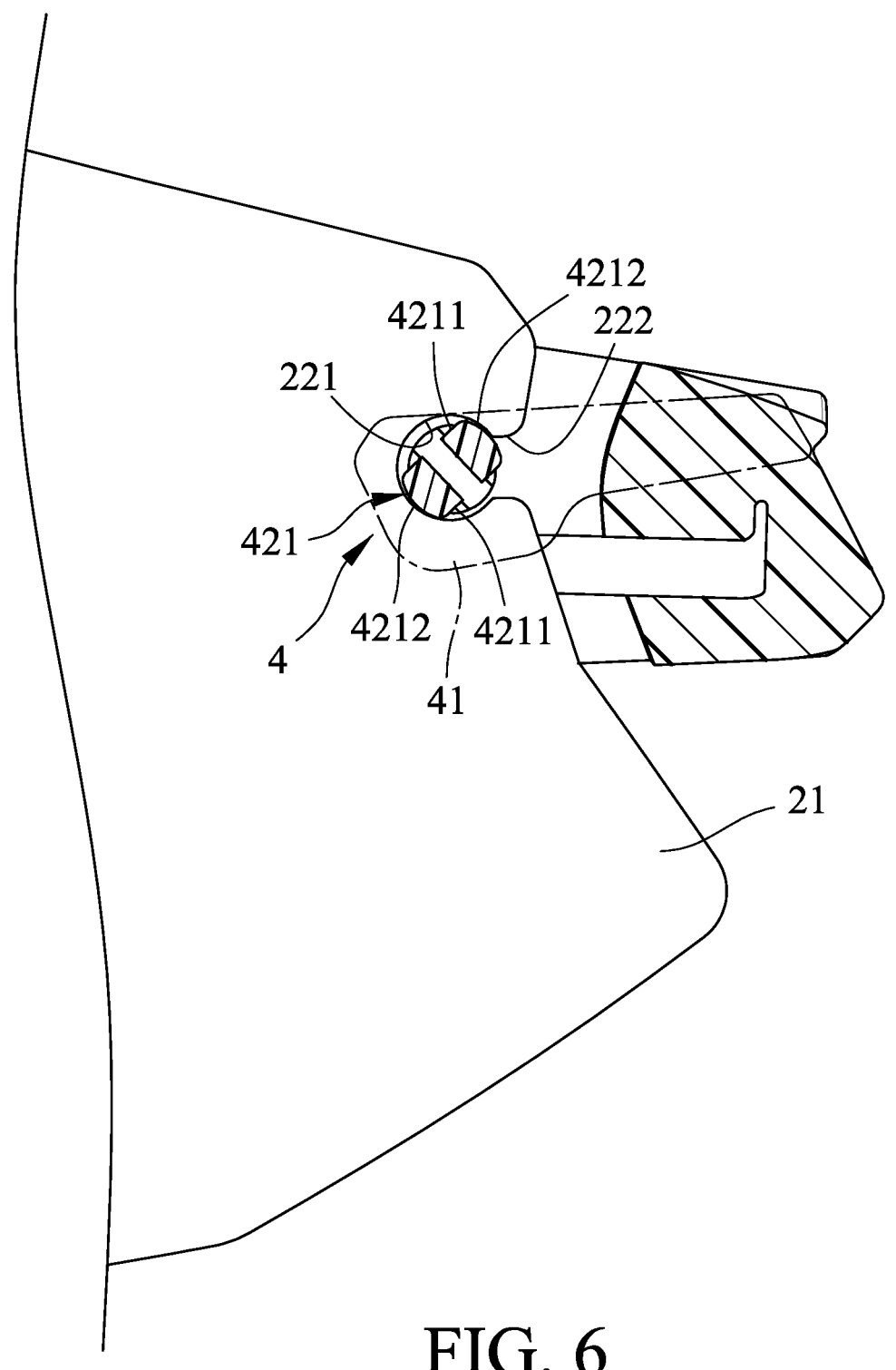
FIG. 6 is an enlarged fragmentary partly sectional view of FIG. 2, illustrating an operating portion of the fastener member of the embodiment in a locking position.

Referring to FIG. 6, in combination with FIGS. 2 and 5, the operating portion 41 of the fastener member 4 can be pulled by a user to drive the latching portion 42 to rotate, and is movable between a locking position, in which the connecting member 3 is positioned on the lens body 21, and an unlocking position, in which the connecting member 3 is allowed to detach from the lens body 21. During pulling of the operating portion 41, because the guide pin 43 is designed to slide in the guide groove 321, movement of the operating portion 41 can be smoothly facilitated. Furthermore, each positioning groove section 324, which is deeper than the guide groove 321, is used for engaging with the positioning pin 44 and thereby produce a staged feedback feel.

When the operating portion 41 is in the locking position, as shown in FIG. 6, the positioning pin 44 is located in one of the positioning groove sections 324, and neither of the short sides 4212 of the latch body 421 is facing the opening section 222. Since the maximum length of the latch body 421 is greater than the width of the opening section 222, the latching portion 42 cannot move out of the engaging section 221 and is positioned thereat. As a result, the fastener member 4 can secure the connecting member 3 to the lens body 21. Specifically, in this embodiment, after the connecting members 3 of the two quick release mechanisms are secured to the left and right sides 22 of the lens body 21, the two temples (A) shown in the imaginary lines in FIG. 2 are respectively connected to the connecting members 3, so that a complete one of the eyeglasses is assembled for the user to wear. It should be noted herein that the temples (A) shown in FIG. 2 are only one type of temples, and are not limited to the aforesaid disclosure.

Figure 7:
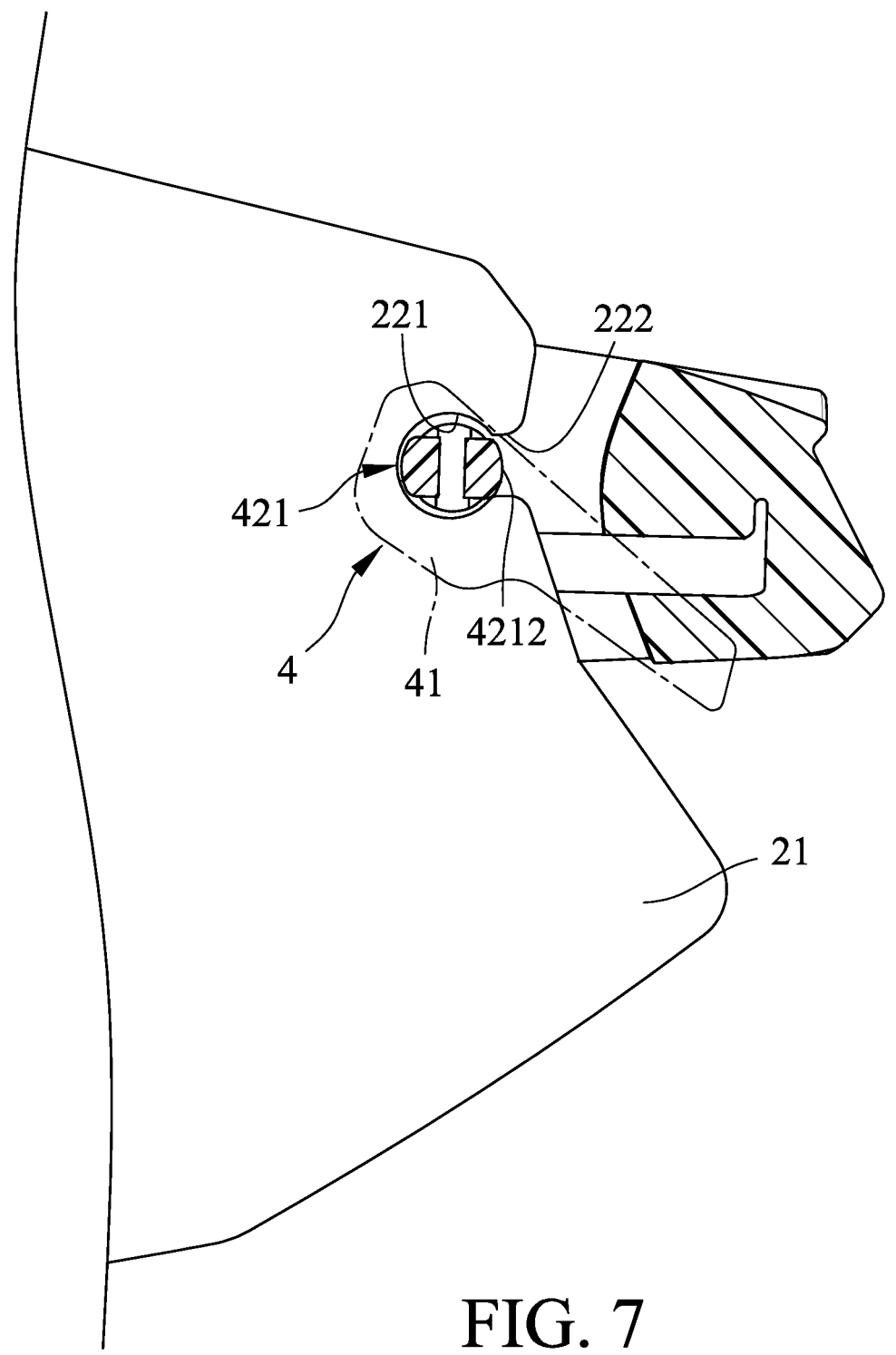
FIG. 7 is a view similar to FIG. 6, but with the operating portion of the fastener member in an unlocking position.

Referring to FIG. 7, in combination with FIGS. 2 and 5, when the operating portion 41 of the fastener member 4 is driven by the user to move the positioning pin 44 from one of the positioning groove sections 324 through the intermediate groove section 323 to the other positioning groove section 324, the guide pin 43 is driven to slide from the one end of the guide groove 321 to the other end thereof, and the latching portion 42 is also driven to rotate relative to the through hole 311. When the operating portion 41 is moved to the unlocking position shown in FIG. 7, one of the short sides 4212 of the latch body 421 faces the opening section 222. At this time, since the width of each short side 4212 is smaller than the width of the opening section 222, the latching portion 42 can be moved out of the engaging section 221 through the opening section 222, so that the connecting member 3 can be detached from the lens body 21, and the lens body 21 of the eyeglasses can be repaired or replaced.

Figure 8:
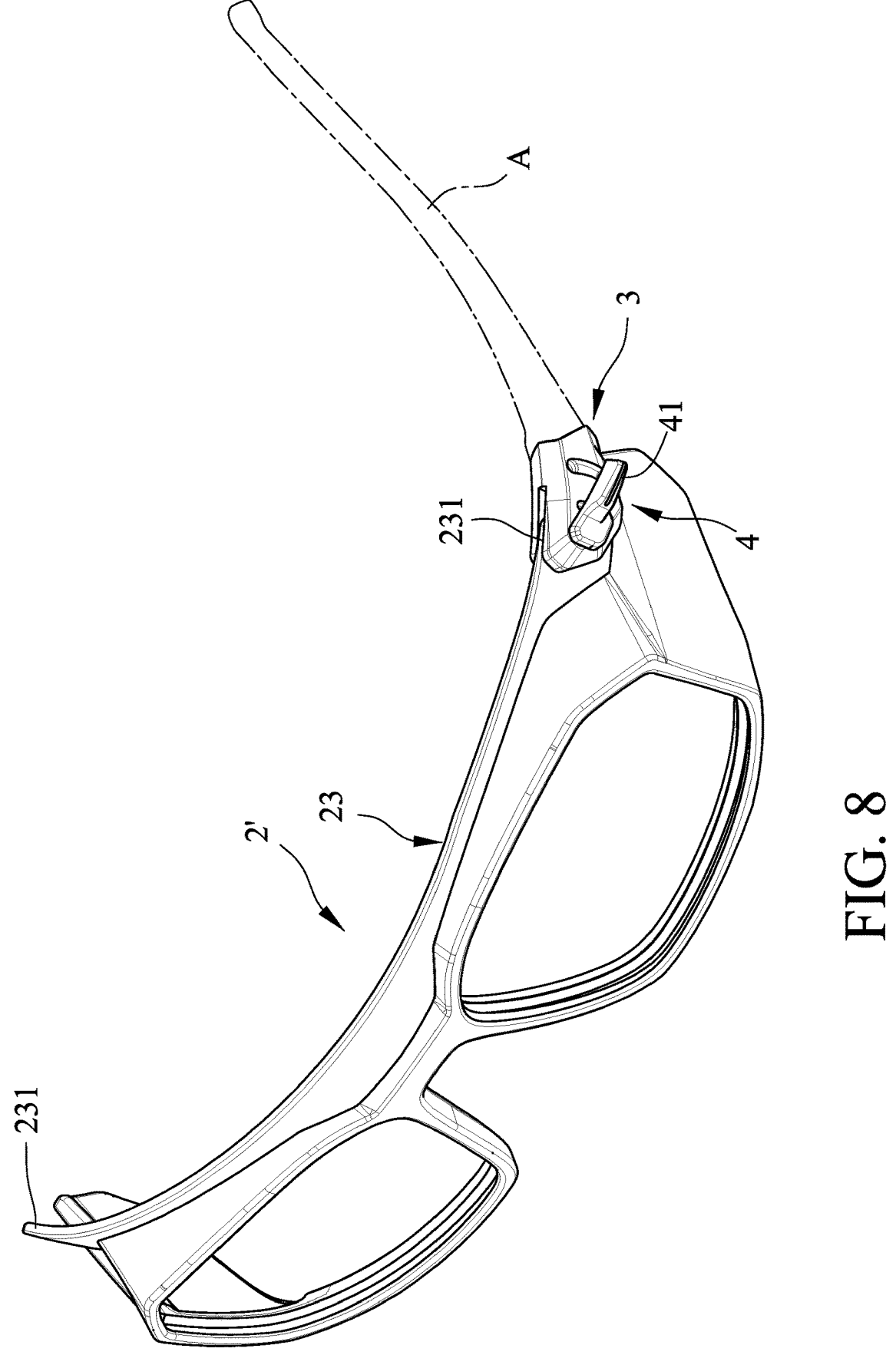
FIG. 8 is a perspective view of another type of eyeglasses incorporating the quick release mechanisms of the embodiment.
Figure 9:
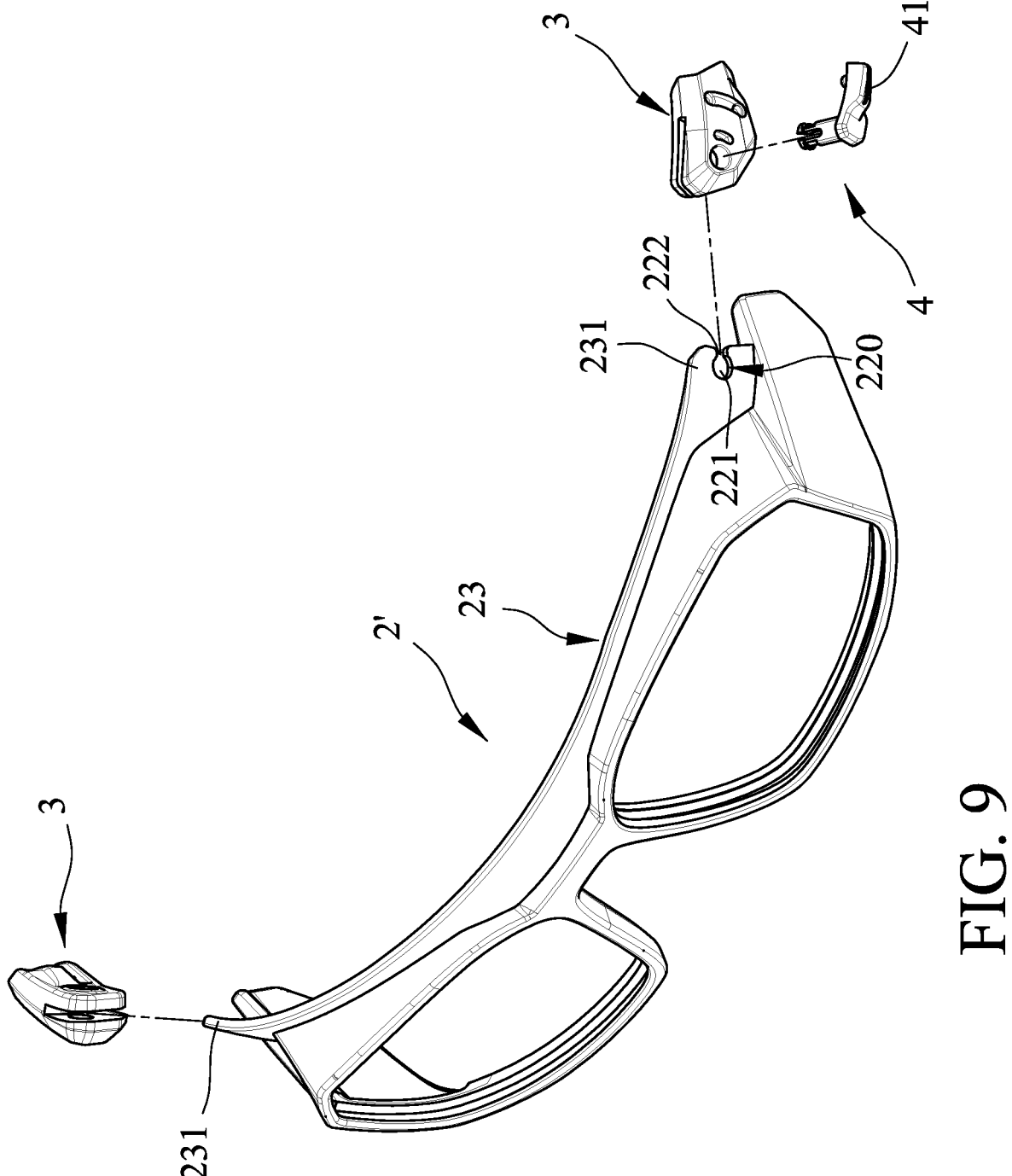
FIG. 9 is an exploded perspective view of FIG. 8.

Referring to FIGS. 8 and 9, the quick release mechanisms of this disclosure are shown incorporated into an eyeglass component 2' of another type of eyeglasses which includes two lenses (not shown), an eyeglass frame 23, and two temples (A). The eyeglass component 2' exemplified in this case is the eyeglass frame 23. Each of left and right sides of the eyeglass frame 23 is formed with an engaging groove 220 which is similar to the engaging groove 220 formed in each of the left and right sides 22 of the lens body 21 (see FIG. 3) and which has the engaging section 221 and the opening section 222.

In this case, the connecting members 3 of the quick release mechanisms are fixed to the left and right sides 231 of the eyeglass frame 23 through the fastener members 4 of the quick release mechanisms. When it is desired to detach each temple (A), the operating portion 41 of the fastener member 4 of each quick release mechanism is moved to the unlocking position so that the connecting member 3 thereof together with the respective temple (A) can be detached from the eyeglass frame 23.

Figure 10:
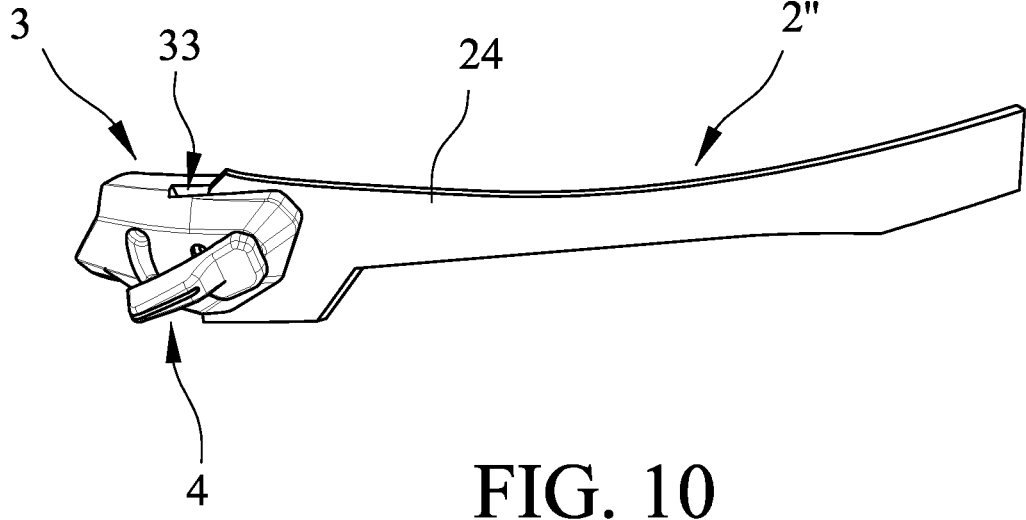
FIG. 10 is a side view of a temple of eyeglasses incorporating the quick release mechanism of the embodiment.
Figure 11:
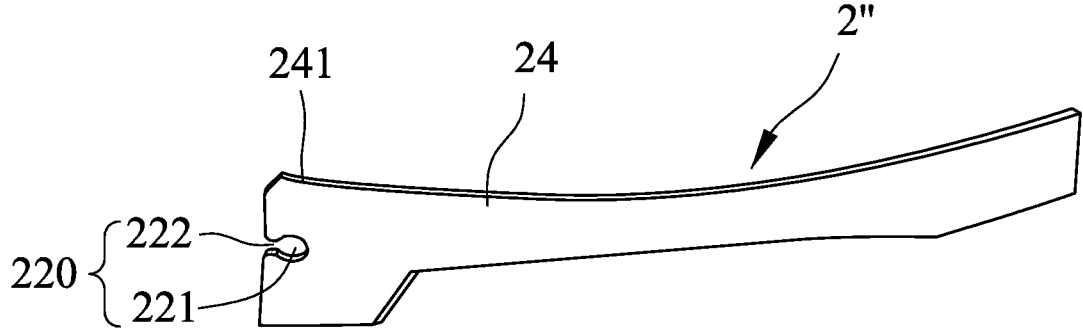
FIG. 11 is a side view of the temple of the eyeglasses of FIG. 10.

Referring to FIGS. 10 and 11, the quick release mechanism of this disclosure is shown incorporated into an eyeglass component 2" of eyeglasses. The eyeglasses may be of any type, and the eyeglass component 2" exemplified in this case is the temple 24. Only one quick release mechanism of this disclosure connected to one of the temples 24 (only one is shown) of the eyeglasses will be described hereinafter. An inner side 241 of the temple 24 is formed with an engaging groove 220 which is similar to the engaging groove 220 formed in each of the left and right sides 22 of the lens body 21 (see FIG. 3) and which has the engaging section 221 and the opening section 222.

In this case, the accommodating groove 33 in the connecting member 3 is configured to receive the inner side of the temple 24, and the receiving groove 316 (see FIG. 4) of the connecting member 3 is configured to connect with an eyeglass frame or a lens body (not shown) of the eyeglasses. Through this configuration, the user can quickly replace the temples 24 of the eyeglasses with different styles or shapes. Furthermore, the quick release mechanism of this disclosure is also suitable for use with the temple 24 having different specially designed styles such as having a headband. Moreover, since the connecting member 3 and the fastener member 4 of the quick release mechanism of this disclosure can be used in different eyeglass components of any type of eyeglasses, repair, replacement, and modularization of various components of the eyeglasses can be facilitated.

In summary, by simply operating the operating portion 41 of the quick release mechanism of this disclosure by pulling and moving, the user can quickly disassemble and assemble the eyeglass component 2, 2', 2" from and to the other components of the eyeglasses. The eyeglass component 2, 2', 2" may be configured as the lens body 21, the eyeglass frame 23, or the temple 24, as long as it can cooperate with the connecting member 3 and the fastener member 4 of the quick release mechanism of this disclosure to allow the user to freely assemble different eyeglass components according to different requirements. Hence, use of the quick release mechanism of this disclosure can achieve rapid replacement of the eyeglass component 2, 2', 2" using simple and quick steps, and is thus labor-saving. As a result, competitiveness of the eyeglass products in the market can be effectively enhanced. Therefore, the object of this disclosure can indeed be achieved.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A quick release mechanism for eyeglasses which includes an eyeglass component formed with at least one engaging groove, the at least one engaging groove having an engaging section, and an opening section communicating with the engaging section and having a width measured in a top-bottom direction smaller than a diameter of the engaging section, said quick release mechanism comprising:

a connecting member configured to be detachably disposed on one side of the eyeglass component, said connecting member being formed with an accommodating groove for receiving the one side of the eyeglass component; and a fastener member for positioning said connecting member on the one side of the eyeglass component and including an operating portion located outside said connecting member, and a latching portion extending inwardly from an inner side surface of said operating portion into said connecting member and the engaging section, said latching portion having a maximum length greater than the width of the opening section but less than the diameter of the engaging section, said latching portion having two long sides, and two short sides each connected between one ends of said long sides, said maximum length of said latching portion being measured between said two short sides, each of said two short sides having a width measured in the top-bottom direction less than the width of the opening section and the diameter of the engaging section, wherein said operating portion is operable to drive said latching portion to rotate, and is movable between a locking position, in which said connecting member is positioned on the eyeglass component, and an unlocking position, in which said connecting member is allowed to detach from the eyeglass component; and wherein, when said operating portion is in said locking position, neither of said short sides of said latching portion is facing the opening section, and said latching portion is positioned in the engaging section; and when said operating portion is in said unlocking position, one of said short sides of said latching portion is facing the opening section, and said latching portion is allowed to move out of the engaging section through the opening section.

2. The quick release mechanism as claimed in claim 1, wherein said connecting member includes an inner bearing body, and an outer bearing body connected to and cooperating with said inner bearing body to define said accommodating groove, said connecting member being further formed with a through hole that extends from an outer side surface of said outer bearing body to an inner side surface of said inner bearing body and that communicates with said accommodating groove, said through hole being configured to align with the engaging section of the at least one engaging groove for rotatable insertion of said latching portion of said fastener member therethrough.

3. The quick release mechanism as claimed in claim 2, wherein said through hole of said connecting member has an outer hole section extending inwardly from said outer side surface of said outer bearing body and communicating with said accommodating groove, an inner hole section extending inwardly from an outer side surface of said inner bearing body and communicating with said accommodating groove, and an enlarged hole section connected to and extending from said inner hole section to said inner side surface of said inner bearing body and having a diameter larger than a diameter of said inner hole section, said latching portion of said fastener member having a latch body for extension into said outer hole section of said through hole and the engaging section of the at least one engaging groove, at least one extension extending inwardly from said latch body into said inner hole section and said enlarged hole section, and at least one engaging hook that is connected to said at least one extension and that extends out of said enlarged hole section and engages with said inner side surface of said inner bearing body.

4. The quick release mechanism as claimed in claim 3, wherein:

said latching portion of said fastener member has a plurality of said extensions spaced apart from each other, and a plurality of aid engaging hooks respectively connected to one ends of said extensions;

when said operating portion of said fastener member is not operated, said engaging hooks are engaged with said inner side surface of said inner bearing body; and when said operating portion of said fastener member is operated, said extensions are deformed to move toward each other and allow said engaging hooks to pass through said enlarged hole section and out of said inner hole section.

5. The quick release mechanism as claimed in claim 2, wherein said outer bearing body of said connecting member has a curved slide groove formed in said outer side surface thereof, said fastener member further includes a positioning pin extending inwardly from said inner side surface of said operating portion and slidably received in said curved slide groove.

6. The quick release mechanism as claimed in claim 5, wherein said outer bearing body of said connecting member further has a curved guide groove formed in said outer side surface thereof and located between said through hole and said curved slide groove, said fastener member further including a guide pin extending inwardly from said inner side surface of said operating portion and slidably received in said curved guide groove.

7. The quick release mechanism as claimed in claim 6, wherein said curved slide groove of said connecting member has an intermediate groove section, and two positioning groove sections respectively located on two opposite ends of said intermediate groove section.

* * * * *